United States Patent
Thaemlitz

(10) Patent No.: US 7,098,171 B2
(45) Date of Patent: Aug. 29, 2006

(54) SYNTHETIC FILTRATION CONTROL POLYMERS FOR WELLBORE FLUIDS

(75) Inventor: Carl J. Thaemlitz, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 172 days.

(21) Appl. No.: 10/436,828

(22) Filed: May 13, 2003

(65) Prior Publication Data

US 2004/0229755 A1    Nov. 18, 2004

(51) Int. Cl.
*C09K 8/12*    (2006.01)
*C08F 271/02*    (2006.01)

(52) U.S. Cl. .................... 507/121; 507/123; 507/226; 507/229; 525/283

(58) Field of Classification Search ................ 507/121, 507/123, 226, 229; 525/283
See application file for complete search history.

(56) References Cited

U.S. PATENT DOCUMENTS

| | | | | |
|---|---|---|---|---|
| 2,983,712 | A | 5/1961 | Wilkinson | 260/79.3 |
| 3,547,899 | A | 12/1970 | Arit et al. | 260/79.3 |
| 4,048,077 | A | 9/1977 | Engelhardt et al. | 252/8.5 C |
| 4,309,523 | A | 1/1982 | Engelhardt et al. | 526/240 |
| 4,357,245 | A | 11/1982 | Engelhardt et al. | 252/8.5 A |
| 4,460,627 | A | 7/1984 | Weaver et al. | 427/212 |
| 4,471,097 | A | 9/1984 | Uhl et al. | 526/240 |
| 4,500,357 | A | 2/1985 | Brothers et al. | 524/5 |
| 4,532,052 | A | 7/1985 | Weaver et al. | 507/222 |
| 4,626,362 | A | 12/1986 | Dickert, Jr. et al. | 252/8.5 A |
| 5,025,400 | A | 6/1991 | Cook et al. | 363/522 |
| 5,432,292 | A | 7/1995 | Sloan, Jr. | 585/15 |
| 6,380,137 | B1 | 4/2002 | Heier et al. | 507/121 |
| 6,566,309 | B1 * | 5/2003 | Klug et al. | 507/90 |
| 2004/0244975 | A1 * | 12/2004 | Heier et al. | 166/276 |

FOREIGN PATENT DOCUMENTS

| | | |
|---|---|---|
| EP | 1 033 378 A1 | 2/2000 |
| WO | WO 96/04348 | 2/1996 |

OTHER PUBLICATIONS

Foreign communication from a related counterpart application dated Nov. 11, 2004.
Adelina J. Son, Thomas M. Ballard, Royal E. Loftin, "Temperature-Stable Polymeric Fluid-Loss Reducer Tolerant to High Electrolyte Contamination," SPE 13160, SPE Drilling Engineering, pp. 209-217 (Sep. 1987).
S. Dwight Strickland, "Polymer Drilling Fluids in the 1990's: Will They Replace Oil-Based Muds?" SPE 29211, Journal of Petroleum Technology, pp. 691-692, 714 (Aug. 1994).
S. Dwight Strickland, Polymer Drilling Fluids in the 1990's: Will They Replace Oil-Based Muds?, SPE 29211, JPT Aug. 1994, pp. 691-692, 714.
Adelina J. Son, et al., Temperature-STable Polymeric Flud-Loss Reducer Tolerant to High Electrolyte Contamination, SPE 13160, SPE Drilling Engineering, Sep. 1987, pp. 209-217.

* cited by examiner

*Primary Examiner*—Philip C. Tucker
(74) *Attorney, Agent, or Firm*—Craig W. Roddy; Karen B. Tripp

(57) ABSTRACT

New polymers, and their applications in water-based wellbore service fluids, such as, for example, drilling fluids, yield desirable filtration control and rheological properties to such fluids even after exposure to HTHP aging. Typical temperatures encountered during such aging are around 350–400° F. and the duration of the exposure is some significant time such as 16 hours or longer. Preferably, the polymers are random terpolymers of N-vinylcaprolactam, vinyl sulfonate monomer 2-acrylamido-2-methyl-1-propanesulfonic acid, and monomer acrylamide, most preferably in a molar ratio of 15:20:65 respectively. The polymers reduce HTHP filtration volumes in fresh water, sea water, potassium chloride, and lime mud systems. The polymers may also be used to inhibit or reduce shale erosion.

15 Claims, No Drawings

SYNTHETIC FILTRATION CONTROL POLYMERS FOR WELLBORE FLUIDS

BACKGROUND OF THE INVENTION

1. Field of the Invention

This invention relates to improvements in water-based well servicing fluids which better enable drilling and well servicing at high temperatures and high pressures. More particularly, this invention relates to polymer additives for water-based drilling fluids and other wellbore servicing fluids that afford desirable filtration control and rheological properties after exposure to a prescribed HTHP aging process.

2. Description of Relevant Art

Water based or aqueous based drilling fluids or muds are well known in the oil and gas industry, as are certain synthetically prepared polymers belonging to the vinyl sulfonate/vinyl amide (VSVA) class of polymers for use in such fluids. The polymer compositions often include the vinyl sulfonate monomer 2-acrylamide-2-methyl-1-propane-sulfonic acid (AMPS). The vinyl amide structure of the polymer is often derived from the monomer acrylamide (AM).

Several AMPS/AM (or VSVA) polymers are available commercially for use as high temperature/high pressure (HTHP) filtration control additives for water based muds. Examples of such polymers include KEMSEAL™, available from Baker Hughes, Inc. in Houston, Tex., DURALON™, available from MI, L.L.C. in Houston, Tex., DRISCAL®-D, available from Phillips Petroleum Co. in Bartlesville, Okla., and ALCOMER® 242, available from Allied Colloids Ltd of the United Kingdom. Such commercially available polymers typically comprise two monomers AMPS and AM and are either linear or crosslinked in structure. During preparation, crosslinking of the VSVAs can be induced or controlled by the choice of reaction initiator chemistry or by the deliberate incorporation of some monomer known to induce crosslinking, such as methylene-bis-acrylamide or divinylbenzene. When VSVAs incorporate the monomer N-methyl-N-vinylacetamide (VIMA or VMA), the fluid typically shows desirable wellbore fluid performance characteristics under HTHP conditions. Random terpolymers consisting of AMPS, N-methyl-N-vinylacetamide (VIMA or VMA), and AM are commercially available and known to usually impart desirable performance characteristics to a water-based mud under HTHP conditions. Preferred examples are THERMA-CHEK™, available from Halliburton Energy Services, Inc., and HOSTADRILL® V2825, available from Clariant of Switzerland and previously from Hoechst Aktiengesellschaft of Germany.

Although VSVA polymers are known to typically impart desirable mud performance characteristics under HTHP conditions to water-based muds, and such polymers have been available for many years, there is a need for improved fluid performance beyond that which the VSVA polymers can provide.

SUMMARY OF THE INVENTION

A polymer is disclosed that affords improved filtration and rheological properties to drilling fluids and other wellbore service fluids even after aging at high temperatures and pressures. The polymer may also be beneficial in stabilizing or reducing shale erosion during drilling. The polymer effects this latter benefit by encapsulating drill cuttings. The polymer of the invention comprises N-vinylcaprolactam, vinyl sulfonate, and acrylamide. Preferably, the vinyl sulfonate is 2-acrylamido-2-methyl-1-propanesulfonic acid. Also preferably, the polymer is a terpolymer of at least 10 mole % N-vinylcaprolactam and at least 2 mole % to about 50 mole % 2-acrylamido-2-methyl-1-propanesulfonic acid copolymerized with enough acrylamide to cause the sum of the three monomers to be 100 mole %.

Whenever the polymer comprises other monomers in addition to N-vinylcaprolactam, vinyl sulfonate and acrylamide, these three monomers (N-vinylcaprolactam, vinyl sulfonate and acrylamide) together should be predominant in the polymer or the polymer should have the behavior of a terpolymer of these three monomers when hydrolyzed. That is, the polymer should have a negative surface charge and enhanced molecular volume.

According to the method of the invention the polymer of the invention is added to drilling fluids or other wellbore service fluids in sufficient quantities to effect improved HTHP performance and/or reduction in shale erosion. The polymer may be subjected to hydrolytic conditions in the fluid whereunder the cyclic amide ring of the N-vinylcaprolactam monomer may open to create a secondary amine structure on the backbone of the polymer with a six carbon chain terminated by a carboxyl group.

DETAILED DESCRIPTION OF PREFERRED EMBODIMENTS

The present invention provides a material capable of imparting significant performance enhancements to high temperature, water-based muds. These significant performance enhancements include a 25%–50% reduction in HTHP filtration volumes at 350°–400° F. and improved rheological properties relative to prior art materials such as THERMA-CHEK™ in fresh water, sea water, potassium chloride, and lime mud systems. The material may also be beneficial in stabilizing or reducing shale erosion during drilling. The material effects this benefit by encapsulating drill cuttings during drilling. Without wishing to be limited by theory, the material is believed to provide both a physical barrier against shale erosion and also a chemical/electron charge barrier against shale erosion.

This material of the invention comprises a polymer of N-vinylcaprolactam, AMPS, and acrylamide. Preferably, the polymer is comprised of about 2 mole % to about 50 mole % N-vinylcaprolactam, about 2 mole % to about 50 mole % AMPS, and acrylamide in sufficient mole % to make the sum of the mole % values of these three monomers equal to about 100%. More preferably, the polymer will not contain less than about 10 mole % N-vinylcaprolactam. Most preferably, the polymer is composed of about 15 mole % N-vinylcaprolactam, about 20 mole % AMPS and about 65 mole % acrylamide. The polymer is typically in powder form, which is easily added to water-based muds.

The invention further provides methods for making and applying the materials of the invention to obtain improved or enhanced filtration control and/or rheological properties and/or shale erosion inhibition properties of a "wellbore service fluid" used in a subterranean formation, particularly in association with the drilling or recovery of oil or gas. The invention also provides methods for using fluids comprising the materials of the invention.

As used herein, the term "wellbore service fluid" shall be understood to mean drilling fluid or another wellbore service fluid such as completion fluid, fracturing fluid, stimulation fluid, conformance or water shut-off application fluid, workover fluid, or packer fluid. That is, the invention is not limited in its utility to drilling a wellbore, although such application is a preferred use. Moreover, as used herein, the wellbore service fluids in which the materials of the invention are suitable for use are generally water-based, although such base may be fresh water, sea water, a potassium chloride mud system, a lime mud system, or other aqueous fluid.

The advantages of the invention are best appreciated in a high temperature, high pressure environment. The materials of the invention impart desirable filtration control and rheological properties to wellbore service fluids even after aging 16 hours or more at high temperatures and pressures. As used herein, high temperature means a temperature of at least about 325° F. and more typically about 350° F. to about 400° F. and high pressure means at least about 10,000 psi, or as commonly understood in the oil and gas industry when referring to HTHP environments. The materials of the invention are not limited, however, to use in HTHP environments and may be added to wellbore service fluids for use at lower temperatures and pressures.

A preferred method for preparing the polymer of the invention is by a precipitation polymerization procedure. To create a preferred even monomer distribution (random or alternating) throughout the chemical structure of the polymer chain, the monomers should have similar polymerization reactivity values or ratios. That is, it is preferable for each monomer to be just as likely to polymerize with any other monomer present in solution as it is to polymerize with an identical monomer. The monomer AMPS is known to readily form copolymers with the monomers acrylonitrile, acrylamide and acrylic acid. AMPS and acrylamide are commonly used in the production of vinyl sulfonate-vinyl amide polymers used in oilfield applications. According to the present invention, AMPS and acrylamide are copolymerized with N-vinylcaprolactam for significantly better performance than achievable with prior art polymers.

Before polymerization, it is preferable to have a homogeneous solution of solvent and monomers, as this provides for a mostly equal probability of each monomer species being able to react with another to form a random polymeric structure. A mixture of water and an alcohol having from one to four carbon atoms provides one of the best solvents for carrying out the copolymerization of the monomers. The preferred alcohol is t-butanol. The polymerization is preferably initiated with the azo compound 2,2'-azobisisobutyronitrile (AIBN). The quantity of AIBN used for making polymers used for the experiments discussed below was about 1% (w/w) of the theoretical polymer yield. A persulfate in a redox system with bisulfite might alternatively be used to initiate the polymerization, but AIBN affords more control and results in less crosslinking. The molecular weight of the polymers in the reaction solvent package of water and t-butanol is influenced by the ratio of water to t-butanol. The solubility of the growing polymer is dependent upon the ratio of water to t-butanol. Polymerization proceeds much more rapidly when the growing macroradical chain is in solution rather than precipitated from solution. Under these particular reaction conditions, there is little evidence of significant molecular weight gain after the polymer has precipitated from solution. A different polymerization technique, however, would not necessarily yield the same results. For example, the Norris-Trommsdorff Effect may be more likely to cause molecular weight increases during other polymerization techniques, such as gel polymerization.

In general, the molecular weight of polymers prepared in the water/t-butanol mixture range from about 500,000 g/mole to about 4,000,000 g/mole, an ideal molecular weight range for filtration control polymers in water-based drilling fluids.

Molecular weight is best controlled by the addition of chain transfer agents to the monomer solution. Mercaptans, such as dodecylmercaptan, are often used as chain transfer agents. They limit molecular weight by terminating the free radical of a growing polymer chain and then initiating a single monomer to start the growth of a new polymer chain. Chain transfer reagents of this kind do not typically affect the rate of polymerization. Additives called reaction modifiers may help to harmonize the chemical reactivities of the monomers, helping to form polymers having an even distribution of monomeric structures within the polymer backbones. This uniformity in structures also results in a polymer whose composition is relatively easy to duplicate from batch-to-batch of production. Examples of such additives are various alkylamines, such as, for example, triethanolamine. These additives may operate by a variety of mechanisms, such as retardation of the rate of polymerization or by increasing the susceptibility of a less reactive monomer to free radical attack and subsequent polymerization. When used in preparing some polymers of the invention used in experiments discussed below, chain transfer agents and modifers were added at concentrations of about 0.17% (w/w) of the quantity of solvent. However, regardless of the presence of a chain transfer agent or a reaction modifier, filtration control values for polymers of the invention generally remain constant or at least constantly satisfactory. The HTHP filtration control properties of the polymers of the invention appear to be more influenced by chemical structure than by molecular weight.

Reducing the quantity of AMPS and increasing the quantity of acrylamide improves the performance of the polymers of the invention in well service fluids with respect to decreasing HTHP filtrate volume. However, polymers with about 15 mole % or less AMPS monomer usually exhibit significant decreases in performance in the presence of salts at elevated temperatures. Thus, at least about 20 mole % AMPS is preferred to assure consistent high temperature performance over extended periods. At least about 10 mole % and preferably about 15 mole % (or more preferably about 15.5 mole %) of N-vinylcaprolactam in the polymer structure is recommended. The HTHP filtration volume increases towards less desirable or less advantageous levels as the mole % of N-vinylcaprolactam decreases below about 10 mole %.

Summarized in Table 1 below are the filtration control performance properties (as demonstrated by HTHP filtration volume) of a preferred terpolymer of the invention composed of 20% AMPS, 65% acrylamide and 15% N-vinylcaprolactam compared to the filtration control performance properties of THERMA-CHEK™ in four different mud formulations. The percent improvement with the polymer of the invention relative to THERMA-CHEK™ is stated and indicates for each sample that the polymer of the invention yielded a 25% to 50% reduction in HTHP values compared to THERMA-CHEK™, a significant improvement effected by the polymer of the invention. Each mud containing the polymer of the invention and each mud containing THERMA-CHEK™ was aged by rolling at 400° F. for 16 hours. The muds were formulated to have a density of 16 lb/gal, as is typical for muds to be used in high pressure zones.

TABLE 1

HTHP Performance Improvements

|  | Polymer of the Invention | THERMA-CHEK ™ (Prior art) | THERMA-CHEK ™ (Prior art) |
|---|---|---|---|
| Fresh Water | 28.0 ml | 37.0 ml | 46.0 ml |
| % Improvement | — | 24.3% | 39.1% |
| Sea Water | 22.0 ml | 44.0 ml | 36.0 ml |
| % Improvement | — | 50.0% | 38.9% |
| Lime Mud | 18.0 ml | 38.0 ml | — |
| % Improvement | — | 52.6% | — |
| Potassium Mud | 102.0 ml | 132.0 ml | — |
| % Improvement | — | 22.7% | — |

The rheological properties imparted to the various fluids by a preferred terpolymer of the invention composed of 20% AMPS, 65% acrylamide and 15% N-vinylcaprolactam may be optimized by adjusting the quantity of polymer added to the fluids. Table 2 compares the fluid rheological properties of this terpolymer with the rheological properties of THERMA-CHEK™ in a water-based drilling fluid and in a sea-water based drilling fluid. As noted above, all fluids were aged by rolling at 400° F. for 16 hours. The data indicates that the polymer of the invention affords better rheological properties to the mud while still maintaining superior HTHP filtration properties (see Table 1).

TABLE 2

Fluid Formulations and Properties

|  | T-CHEK | T-CHEK sea | CT-32T | CT-32T sea |
|---|---|---|---|---|
| Fluid formulations: | | | | |
| Water, bbl (ppb) | 0.65 (228) | 0.63 (222) | 0.65 (228) | 0.63 (222) |
| AQUAGEL GOLD SEAL, ppb | 8 | 8 | 6 | 8 |
| THERMA-THIN, ppb | 6 | 12 | 6 | 12 |
| Caustic soda, ppb | 1 | 1 | 1 | 1 |
| THERMA-CHEK, ppb | 3 | 8 | — | — |
| Lime, ppb | — | — | — | — |
| Potassium chloride, ppb | — | — | — | — |
| Sea salt, ppb | — | 9 | — | 9 |
| BAROID, ppb | 396 | 396 | 396 | 396 |
| Rev dust, ppb | 30 | 30 | 30 | 30 |
| Experimental Polymer | — | — | 2 | 4 |
| Fluid properties: | | | | |
| Mud weight, ppb | 16.0 | 16.0 | 16.0 | 16.0 |
| pH before aging | 12.1 | 11.7 | 12.7 | 11.5 |
| Aging temp., ° F. | 400 | 400 | 400 | 400 |
| Aging conditions | rolling | rolling | rolling | rolling |
| Aging period, hr | 16 | 16 | 16 | 16 |
| pH after aging | 10.8 | 9.2 | 10.3 | 9.2 |
| Fann 35A data- | | | | |
| pH | 10.8 | 9.2 | 10.3 | 9.2 |
| Temperature, ° F. | 120 | 120 | 120 | 120 |
| 600 rpm | 154 | 166 | 153 | 107 |
| 300 rpm | 96 | 97 | 97 | 74 |
| 200 rpm | 73 | 70 | 75 | 58 |
| 100 rpm | 48 | 40 | 49 | 39 |
| 6 rpm | 15 | 5 | 15 | 11 |
| 3 rpm | 12 | 3 | 13 | 10 |
| AV, cP | 77 | 83 | 76.5 | 53.5 |
| PV, cP | 58 | 69 | 56 | 33 |
| YP, lb/100 ft² | 38 | 28 | 41 | 41 |
| 10 sec. gel, lb/100 ft² | 14 | 5 | 13 | 10 |
| 10 min. gel, lb/100 ft² | 16 | 23 | 17 | 31 |
| HTHP@350° F., ml | 37.0 | 44.0 | 30.0 | 21.0 |

N-vinylcaprolactam has a cyclic amide structure as shown below:

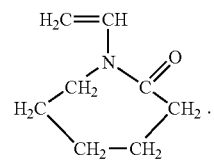

When a polymer of the invention containing N-vinylcaprolactam is exposed to hydrolytic conditions, as will typically occur in a wellbore service fluid in a subterranean formation, the cyclic amide ring opens to create a secondary amine structure on the backbone of the polymer, along with a six carbon chain terminated by a carboxyl group. This carbon chain is capable of extending past the chain lengths of the AMPS structure. This structure results in a greater molecular volume of the polymer in the wellbore service fluid than typically seen with prior art VSVA polymers used in the oilfield. This structure also results in the polymer having a negative molecular surface charge, significantly different from prior art VSVA polymers used in the oilfield.

In application, polymers of the invention may be added to a water-based well service fluid, generally in quantities of 0.5 lb/bbl to 10.0 lb/bbl, depending on the fluid effects desired, adding greater amounts when more filtration control and/or viscosity is desired and lesser amounts when less filtration control and/or viscosity is needed. The polymers may be added at the wellsite or earlier. Polymers of the invention are believed to be non-toxic.

The foregoing description of the invention is intended to be a description of preferred embodiments. Various changes in the details of the described fluids and methods of use can be made without departing from the intended scope of this invention as defined by the appended claims.

What is claimed is:

1. An additive for water-based wellbore service fluids that enhances performance of the fluids at high temperatures and pressures, said additive comprising a terpolymer wherein said terpolymer comprises about 2 mole % to about 50 mole % N-vinylcaprolactam, about 2 mole % to about 50 mole % 2-acrylamido-2-methyl-1-propanesulfonic acid, and sufficient mole % acrylamide so that all three monomers equal 100%.

2. The additive of claim 1 wherein said N-vinylcaprolactam has the following chemical structure on the polymer:

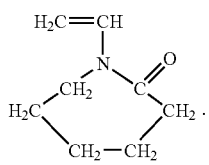

3. The additive of claim 2 wherein said polymer is exposed to hydrolytic conditions causing the cyclic amide ring of the N-vinylcaprolactam monomer to open to create a secondary amine structure on the backbone of the polymer with a six carbon chain terminated by a carboxyl group.

4. The additive of claim 1 wherein said polymer has a negative surface charge.

5. The additive of claim 3 wherein said polymer has a negative charge after being exposed to hydrolytic conditions.

6. The additive of claim 1 wherein said terpolymer is at least about 10 mole % N-vinylcaprolactam copolymerized with about 20 mole % to about 50 mole % 2-acrylamido-2-methyl-1-propanesulfonic acid, and enough acrylamide for the sum of the three monomers to equal 100 mole %.

7. The additive of claim 1 wherein said terpolymer is about 15 mole % N-vinylcaprolactam, about 20 mole % 2-acrylamido-2-methyl-1-propanesulfonic acid, and about 65 mole % acrylamide.

8. A method for enhancing the performance of a water-based wellbore service fluid at high temperatures or pressures, said method comprising adding to said fluid the additive of claim 1.

9. A method for enhancing the performance of a water-based wellbore service fluid at high temperatures or pressures, said method comprising adding to said fluid a polymer comprising acrylamide, vinyl sulfonate monomer, and N-vinylcaprolactam, wherein said polymer is a terpolymer of at least about 10 mole % N-vinylcaprolactam copolymerized with about 20 mole % to about 50 mole % 2-acrylamido-2-methyl-1-propanesulfonic acid and enough acrylamide for the three monomers to equal 100 mole %.

10. The method of claim 9 further comprising exposing said polymer to hydrolytic conditions causing the cyclic amide ring of the N-vinylcaprolactam monomer on said polymer to open to create a secondary amine structure on the backbone of the polymer with a six carbon chain terminated by a carboxyl group.

11. The method of claim 10 wherein said polymer has a negative charge.

12. A method for controlling shale erosion during drilling a wellbore in a shale bearing subterranean formation, said method comprising employing a drilling fluid in said drilling that comprises a terpolymer having about 2 mole % to about 50 mole % N-vinylcaprolactam, about 2 mole % to about 50 mole % 2-acrylamido-2-methyl-1-propanesulfonic acid, and sufficient mole % acrylamide so that all three monomers equal 100%, wherein the polymer stabilizes drilled cuttings by encapsulation.

13. A method for drilling or servicing a wellbore in a high temperature subterranean formation, said method comprising employing a wellbore service fluid comprising a terpolymer wherein said terpolymer comprises about 2 mole % to about 50 mole N-vinylcaprolactam, about 2 mole % to about 50 mole % 2-acrylamido-2-methyl-1-propanesulfonic acid, and sufficient mole % acrylamide so that all three monomers equal 100%.

14. The method of claim 13 wherein said terpolymer has a negative charge after exposure to hydrolytic conditions.

15. The method of claim 13 wherein said terpolymer is at least about 10 mole % N-vinylcaprolactam copolymerized with about 20 mole % to about 50 mole % 2-acrylamido-2; -methyl-1-propanesulfonic acid, and enough acrylamide for the sum of the three monomers to equal 100 mole %.

* * * * *